United States Patent [19]
Klug et al.

[11] Patent Number: 6,152,211
[45] Date of Patent: Nov. 28, 2000

[54] CORE COMPOSITIONS AND ARTICLES WITH IMPROVED PERFORMANCE FOR USE IN CASTINGS FOR GAS TURBINE APPLICATIONS

[75] Inventors: Frederic Joseph Klug, Schenectady; Robert Arthur Giddings, Slingerlands, both of N.Y.

[73] Assignee: General Electric Company, Schenectady, N.Y.

[21] Appl. No.: 09/224,164

[22] Filed: Dec. 31, 1998

[51] Int. Cl.[7] .................................................... B22C 9/04
[52] U.S. Cl. ........................... 164/518; 164/519; 164/361
[58] Field of Search ..................................... 164/518, 519, 164/361

[56] References Cited

U.S. PATENT DOCUMENTS

| | | |
|---|---|---|
| 4,024,300 | 5/1977 | Svec . |
| 4,164,424 | 8/1979 | Klug et al. . |
| 5,014,763 | 5/1991 | Frank . |
| 5,158,916 | 10/1992 | Claussen . |

FOREIGN PATENT DOCUMENTS

| | | |
|---|---|---|
| 1220222 | 4/1984 | Russian Federation . |

OTHER PUBLICATIONS

Young, Omatete, Janney and Menchhofer, "Gelcasting of Alumina", American Ceramic Society Bulletin, vol. 74, No. 3, Mar. 1991, pp. 612–618.

Young, Omatete, Janney and Menchhofer, "Gelcasting of Superalloy Powders", Janney 4th International Conference on Powder Metallurgy in Aerospace, Defense, and Demanding Applications, Anaheim, CA, May 8–10, 1995.

Claussen, Tuyen, and Wu, "Low Shrinkage Reaction Bonded Alumina", Journal of the European Ceramic Society, [5] (1989) 29–35.

Claussen, Jansen, and Holtz, "Reaction Bonding of Aluminum Oxide (RBAO)", Journal of the Ceramic Society of Japan, 103, [8] 738–46 (1995).

Holtz, Wu, Scheppokat, and Claussen, "Effect of Processing on Phase and Microstructure Evolution in RBAO Ceramics", Journal of the American Ceramic Society, [77] 10 2509–17 (1994).

Wu, Travitzky, and Claussen, "Processing of Reaction bonded Alumina (RBAO) Composites", Proceedings of the 11th International Rise Symposium on Metallurgy and Materials Science: Structural Ceramics Processing Microstructure and Properties (1990).

Wu, Holtz, and Claussen, "Mechanisms and Kinetics of Reaction Bonded aluminum Oxide Ceramics", Journal of the American Ceramic Society [76] 970–980 (1993).

Wu and Claussen, "Fabrication of Properties of Low Shrinkage Reaction Bonded Mullite", Journal of the American Ceramic Society [74] vol. 10, pp. 2460–2463 (1991).

*Primary Examiner*—Kuang Y. Lin
*Attorney, Agent, or Firm*—Noreen C. Johnson; Douglas E. Stoner

[57] ABSTRACT

A method for fabricating a fired ceramic article, a green product, and a fired ceramic article, all for use as a core in the investment casting of directionally solidified eutectic and superalloy material. A ceramic slurry is prepared of alumina, aluminum and a solution of a polymerizable binder in a liquid. The slurry is extruded under low pressure into a closed cavity to form a gelled green product which is subsequently heated in an oxygen-containing atmosphere, wherein the oxygen reacts with the aluminum in the green product to form alumina which advantageously causes an increase in volume of the green product which counters the shrinkage effects of heating. The polymerizable binder is of a type which cross-links with the alumina and upon heating the liquid component of such binder vaporizes and the remaining polymer component subsequently gasifies on further heating to leave desired interstitial pores within the green product, which assist in allowing the oxygen to permeate the green product, which assists in oxidation of the aluminum through the green product. The green product is thereafter sintered to form a substantially dimensionally precise ceramic article suitable for precision-casting of superalloy materials.

32 Claims, No Drawings

CORE COMPOSITIONS AND ARTICLES WITH IMPROVED PERFORMANCE FOR USE IN CASTINGS FOR GAS TURBINE APPLICATIONS

BACKGROUND OF THE INVENTION

This invention relates to improvements in investing casting of directionally solidified eutectic and superalloy components, and more particularly to alumina shell molds and cores for use in the casting of such superalloy components and a method for making such alumina shell molds.

Turbine blades and nozzles that are used in the newest gas turbines must be cast to accurate dimensions with tight tolerances. Of particular interest is the production of single crystal and directionally solidified castings with precise dimensional control of the thickness and dimensions of the metal wall that separates the cooling gas within the turbine blade from the hot gas stream. The dimensional control of the metal wall of the casting is predominately controlled by the properties of the ceramic, known as a core. In this respect, it is important to be able to manufacture a core, to dimensional precision, corresponding to the dimensions of the desired metal casting.

In addition to requiring dimensional precision in the casting of the ceramic core, the production of the above-described directionally solidified metal eutectic alloys and superalloys requires that the core not only be dimensionally stable but also sufficiently strong to contain and shape the casting. In addition, such core must also be sufficiently durable and deformable to prevent mechanical rupture (hot cracking) of the casting during cooling and solidification. Further, the core materials must be able to withstand superalloy casting temperatures of 1500° C. to 1650° C.

The prior art includes the use of silica or silica-zircon (cristobalite) as core and mold materials. Dimensional control of the silica core is difficult for at least two reasons. First, crystalline-based silica materials for the core material are susceptible to Martensitic-type phase changes during the casting process. Accordingly, as a practical matter, cores made of such materials cannot be completely sintered before use in casting. Otherwise, the core may crack once it is cooled down while still in the associated mold. Secondly, thermal expansion differences between the silica core and the associated mold are typically very large. Accordingly, it is difficult, if not impossible, to tightly fix the silica core within an associated mold without rendering the silica core susceptible to cracking.

Aluminum oxide, or "alumina", by itself, without a chemical or physical binder material, has also been identified as a potential core and mold material based on both chemical compatibility and leachability considerations. Unfortunately, ceramic materials comprised of alumina composites are known to be susceptible to excessive shrinkage during firing and have higher than desired fired densities. Such shrinkage is unacceptable for applications where dimensional precision is required during manufacture, such as in the production of directionally solidified metal eutectic alloys and superalloys.

Further, shrinkage with a concomitant decrease in porosity results in a ceramic article with unsuitable mechanical properties for the casting of superalloys. In this regard, because there generally is a considerable thermal expansion mismatch between the ceramic and the alloy, hoop and longitudinal tensile stresses are experienced by the alloy upon cooling from the superalloy casting temperature. Accordingly, if the ceramic article is very dense (i.e., non-porous) with little plasticity and having a high resistance to deformation at elevated temperatures, this can lead to mechanical rupture or hot tearing of the alloy in the ceramic article.

U.S. Pat. No. 4,164,424 discloses low shrinkage ceramic cores made of alumina which posses sufficient porosity and are, therefore, suitable for use in investment casting of directionally solidified eutectic and superalloy materials. A reactant fugitive filler material, which can include aluminum, is mixed with alumina compact to form a green product. The green product is then subsequently fired at an elevated temperature under a reducing (for example, hydrogen gas) or inert atmosphere, whereby reactant material in the fugitive filler material reduces a portion of the alumina which, in part, is removed from the compact in the gaseous state. Some of these gases are deposited on other alumina grains by vapor phase transport action causing a coarsening and rounding thereof, and creates a network of narrow connecting bridges between the alumina grains. With the formation of coarser particles, shrinkage of the ceramic core is mitigated, enabling manufacturing of such core with dimensional precision. Further, sufficient porosity is maintained such that the core does not develop excessive strength.

Unfortunately, the process associated with making ceramic articles disclosed in U.S. Pat. No. 4,164,424 is relatively expensive, requiring furnaces with precision control of water vapor pressure. Further, where the controlled atmosphere is hydrogen gas, additional safety precautions must be taken due to the explosive nature of such atmosphere. Furthermore, the forming process associated with the intermediate green product in U.S. Pat. No. 4,164,424, namely, high pressure injection molding, typically requires costly equipment, which requires frequent maintenance, for example, die wear, rendering fabrication commercially unattractive.

The process disclosed in U.S. Pat. No. 4,164,424 is further hindered by the use of wax binders. Wax binders are typically employed for enhancing the strength of the intermediate green product. Removal of such binder during the firing process is very time consuming as it relies on capillary action induced by surface forces surrounding granular particles. In any event, removal of the associated green product must necessarily be slow otherwise such green product may be vulnerable to cracking, slumping or blisters.

SUMMARY OF THE INVENTION

In accordance with the teachings of this invention, there is provided a new and improved core for use in the investment casting of directionally solidified eutectic and superalloy materials, a green intermediary product, and a new and improved method of making such a core and green product. The new and improved method for producing such core mitigates the effects of densification during sintering and, therefore, facilitates the making of a core to dimensional precision. The resulting sintered ceramic product is dimensionally stable and of a desired strength to permit deformation during cooling and solidification of a cast alloy. The method of the present invention further enhances the efficiency of fabricating such cores by facilitating the creation of strong but porous intermediate green products whose associated binder can be readily removed (driven off) during heating of the core to thereby reduce total firing time.

Accordingly, as a means of overcoming the drawbacks of the prior art methods and as a means for fabricating a new and improved core product for use in the investment casting of directionally solidified eutectic and superalloy materials, the present invention in one of its broad aspects provides an improved method for fabricating a fired ceramic article suitable for use as a core in the investment casting of directionally solidified eutectic and superalloy material, comprising the steps of preparing a ceramic slurry comprising alumina, aluminum and a solution of a polymerizable binder in a liquid, forming the slurry into a green product of an article shaped body, and heating the green product in an oxygen-containing atmosphere. Advantageously, the polymerizable binder sterically fixes alumina particles in the green product to avoid alumina concentration and ensure that it continues to be continuously dispersed throughout the core, to allow uniform oxidation when such core is situated in an oxygen-containing environment.

In the context of this invention, the liquid that contains the polymerizable binder includes water, an organic solution or a mixture of water and an organic solution. An organic solution is further defined as any organic-containing liquid that substantially dissolves the monomer used as the binder. Suitable examples of liquids that may be used in this invention comprise water, alcohols, toluene, hexane, mixtures thereof, and the like.

The heating of the green product of the aforementioned composition in an oxygen-containing environment is preferably carried out at temperatures to relatively rapidly vaporize the liquid contained in the binder component of the green product. This results in an intermediary green product with open porosity, due inter alia to vaporization of the liquid, which advantageously allows oxygen to better permeate the green product, thereby facilitating oxidation of the aluminum mixed therewith. The oxidation of aluminum in the green product upon heating is extremely desirable in that it forms small alumina crystallites which bond with originally admixed alumina within the green product, to form a stronger core. It also, due to volumetric expansion during the reaction-bonding process, decreases the shrinkage of the product. The resulting decrease in shrinkage of the product is extremely desirable in that the final dimensional shape of the product is easier to control and results in greater reproducibility in the ceramic product. The improved reproducibility of the ceramic product's dimensions results in improved dimensional control of the investment cast superalloys. Advantageously, the polymerizable binder is of a type which oxidizes and/or gasifies upon exposure to heat. In particular, the heating step of the aforementioned method which includes heating at a temperature (typically in the range of about 300–1350° C.) so as to cause reaction bonding of the aluminum within the green product to alumina, is particularly suited to a green product having a polymerizable binder there within which may be vaporized upon exposure to such temperatures. In particular, a polymerizable binder which vaporizes or "burns off" (i.e., oxidizes) in the presence of such temperatures is desirable in that it further contributes to the creation of pores within the green product with the consequent advantages above described.

Accordingly, in such broad aspect of the method of the present invention, such method provides a core of the aforementioned composition wherein the heating thereof, and the exposure to an oxygen-containing atmosphere, accomplishes the following:

(i) vaporization of the liquid containing the polymerizable binder, so as to create a porous structure;

(ii) gasification of the polymerizable binder, resulting in increased porous structure; and (iii) oxidation of the aluminum within the green product to alumina, which is accelerated by such porous structure, which results in reaction bonding with pre-existing admixed alumina, thereby increasing the strength of the core and resulting in a volumetric increase which counteracts the shrinkage effect due to heating; which thereby results in a substantially dimensionally precise and strong but crushable core.

Advantageously, the heating step to accomplish the above may be carried out in one step. However, since typically the temperature needed to vaporize the liquid component of the green product is typically low (in the range of about 20° C.—about 200° C. as the liquid is usually water or an organic solution or a mixture thereof), while the temperature to cause relatively rapid oxidation of the aluminum and the reaction bonding in the oxygen-containing atmosphere as well as the gasification of the polymerizable binder is in the range of about 300° C.—about 1350° C., and the temperature necessary to finally sinter the green product to form a sintered ceramic mold is in the range of about 1350 to about 1650° C., in actual practice the heating step may constitute a single step with gradual heating with increasing temperature up to about 1350 to about 1650° C., wherein the rate of temperature increase (heating) is slow enough to allow each of such steps to be individually completed in sequence.

In a preferred embodiment of the above method, the slurry is formed into a green product by gel casting, and preferably by extruding or pouring the ceramic slurry into a closed cavity. For optimum reaction bonding of alumina to aluminum, it is preferred that the weight ratio of alumina to aluminum within the slurry is within the range of about 20:1 to about 5:2, and it is preferable that the alumina within the admixture of the initial slurry is a fused alumina.

A fired ceramic article made by the aforesaid methods is also disclosed and claimed.

In another aspect of the present invention relating to aluminum and alumina-containing cores and molds, it is discovered that, in forming the green product, it is desirable to use a polymerizable binder to facilitate timely manufacture of the core or mold and to facilitate the manufacture of a core or mold of a desired strength.

Accordingly, in another aspect of the invention, the present invention provides a novel green product for use as a shell mold or core in the investment casting of directionally solidified eutectic and superalloy materials, consisting of a gel article comprising alumina, aluminum, a polymerizable binder and a liquid.

Notably, the polymerizable binder is capable of being oxidized or gasified upon the application of heat to the green product, so as to assist the creation of a porous structure, resulting in the advantages above-described.

In addition, the present invention comprises a method for fabricating a green product for use as a shell mold or core in the investment casting of directionally solidified eutectic and superalloy materials, comprising:

(i) preparing a ceramic slurry of alumina, aluminum, and a solution of a polymerizable binder in a liquid;

(ii) forming the slurry into a green product of an article-shaped body; and (iii) heating said green product in any oxygen-containing atmosphere.

DETAILED DESCRIPTION OF THE INVENTION

The present invention in one of its aspects comprises a process for fabricating core compositions and investment molds and includes the steps of preparing a ceramic slurry comprising of alumina and aluminum metal, forming a green product from such mixture using a low pressure forming method, such as gel casting, and then firing the green product up to a temperature of about 1350° C. to about 1650° C. under an oxygen-containing atmosphere. This process facilitates the fabrication of a core and investment mold with dimensional precision to suit the desired dimensions of the superalloy to be cast from such core or investment mold. Further, cores and investment molds created from this process are dimensionally stable and of a desired strength to permit their deformation during the cooling and solidification of the casting.

A detailed description of such method of the present invention will now be described.

Prior to forming the green product, a ceramic slurry is created comprising of alumina and aluminum.

Suitable alumina for this process is fused alumina with a particle distribution as follows:

| PARTICLE SIZE* | WEIGHT PERCENTAGE |
| --- | --- |
| 120 mesh | 0 to 33% |
| 240 mesh | 25 to 100% |
| 400 mesh | 0 to 33% |
| 900 mesh | 0 to 20% |

*US Standard sieve size

In creating the ceramic slurry, the weight ratio of alumina to aluminum should be in the range of about 20:1 to about 5:2.

Aluminum particle size is, preferably, within the size range of about 4 to about 20 microns. Smaller aluminum particles could be used, but could pose a fire hazard. Generally, larger particles of aluminum are preferred for the purpose of decreasing shrinkage of the final sintered product.

A preferred embodiment of the method of the present invention, for forming both a green product, and a sintered ceramic article, will now be described.

An initial pre-mix is formed comprising fused alumina and aluminum metal in a ratio of approximately about 20:1 to about 5:2 respectively, along with polymerizable binder in the form of a 20 weight % aqueous solution of N-hydroxymethylacrylamide ("HMAM") in distilled water, a thickener such as microcrystalline cellulose with sodium carboxymethylcellulose (NTC-80™), a trade-mark of FMC Corporation for one of their chemical compounds, namely sodium carboymethylcellulose obtainable from FMC Corporation, a deflocculant such as DARVAN™, and a plasticizer such as glycerine for modifying the viscoelastic properties of a resulting gel such that the tendency of the gel to crack during drying is reduced, are all mixed together in a slurry. HMAM is a monomer which will crosslink with the alumina and form a gel when mixed with the alumina and with N,N,N,N'-tetramethylene diamine ("TEMED") and ammonium persulfate ("APS"). TEMED and APS are only added to the pre-mix immediately before the forming operation so as not to prematurely trigger gelation. Because HMAM has a particular tendency to crosslink in the presence of aluminum metal in water, 4-methoxyphenol (MEHQ) is also added to the pre-mix to inhibit premature crosslinking and, therefore, premature gelation. Other polymerizable binders which possess similar abilities to crosslink with alumina or aluminum and which are capable of gasifying or oxidizing upon application of heat and are thus suitable for the purposes of the present invention include methylacrylamide, N,N'-methylenebisacrylamide, methylenebisacrylamide and other monomers in the acrylamide family, vinyl-2-pyrrolidine, and poly(ethylenegycol) 1000 dimethacrylate, and combinations thereof.

Further compounds may be added to the pre-mix slurry. For instance, yttrium and hafnium, as well as yttrium aluminate and the rare earth aluminates, can be added to decrease the reactivity of the alumina shell mold or core during casting of superalloys containing yttrium and hafnium. Colloidal silica can also be added to the slurry as a binder. Magnesium and zirconium can also be included in the pre-mix slurry for increasing refractory properties of the shell mold or core composition.

The pre-mix is then homogenized in a ball mill, degassed under vacuum conditions, mixed with TEMED and APS, and worked up to a green product. The green product of the ceramic slurry can be produced by any one of low pressure forming methods, and preferably by gel casting. The slurry is either poured or extruded into a closed cavity such as a die. Preferably, where extrusion is used, the ceramic slurry is extruded under low pressure (less than 50 psi) into a die and then gelled. The gelling process is preferably accomplished with heat for rapid manufacturing. However, room temperature gelation is preferred where aluminum reactivity is excessive, wherein aluminum is disposed to react with available organic matter to produce undesirable hydrogen gas bubbles.

The green product is allowed to set in the die for 1–2 hours at room temperature (22° C.), or for 15 minutes at 50° C. After gelation, the green product is removed from the die and immediately moved to the first of a series of controlled-humidity drying chambers to avoid cracking or non-uniform shrinkage due to rapid drying. The relative humidity in the first chamber may be maintained at 75% for 12 hours. In the second chamber, the relative humidity was maintained at 50% for 8 hours. Finally, the green product is placed in an oven at approximately 50° C. for a minimum of 8 hours, where humidity was not controlled. Shorter or longer times may be used. The time depends on the cross-sectional variation or thickness of the green product.

Once dried, the green product is heated in a conventional kiln under an oxygen-containing atmosphere to a maximum temperature of about 1350° C. to about 1650° C. for an aggregate period of about 2 to about 48 hours. The heating rate to this temperature is about 50 to about 200° C./hour.

At temperatures of about 50° C. and higher, the polymer becomes dehydrated. Because the gel of the green product comprises, typically, greater than 90% water by weight, removal of the water creates interstitial spaces within the ceramic, resulting in an open-pore product intermediary, which greatly assists in binder removal. Such structure speeds binder removal during sintering by promoting more rapid oxidation (i.e., burning off) of the polymer binder, as well as more complete oxidation the aluminum component within green product. This is because mass transport of oxygen gas is facilitated by the open pore structure.

The rate of binder removal in the present invention where an open pore structure is created may be contrasted with binder removal rate where wax binders are used. In the latter case, binder removal rate is relatively slow because the product intermediary comprises little or no water and, therefore, does not develop an open pore structure during heating. As a result, binder removal is effected by surface tension forces between the ceramic particles and the melted wax binder, which is a relatively time consuming process.

The present invention provides a number of important advantages by providing a low pressure method for fabricating a fired ceramic article for use as a shell mold or core in the investment casting of directionally solidified eutectic and superalloy materials and which is dimensionally stable and of a desired strength such that it is capable of deformation during cooling and solidification of the casting. In this respect, the fired ceramic article is sufficiently porous for facilitating such deformation. The low shrinkage of the fired ceramic article is attributable, at least in part, to the use of aluminum in the ceramic slurry pre-mix. During heating of the intermediate green product, the aluminum oxidizes to alumina thereby helping maintain strength throughout firing and until the fired ceramic article is formed. The volume expansion associated with the oxidation of aluminum during heating of the intermediate green product also compensates for shrinkage of the materials which occurs during firing of the green product. By mitigating the effects of shrinkage in this manner, the ceramic article is fabricated with dimensional precision, facilitating its use as a shell mold or core for the casting of directionally solidified eutectic and superalloy materials. Importantly, the intermediate green product formed by the method of the present invention consists of a gelled article which permits rapid and complete removal of the associated binder, thereby providing commercial utility to the process.

Some of the features and advantages of the present invention are further shown by the following specific non-limitative examples:

EXAMPLE 1

A solution containing 20 wt % of N-Hydroxymethylacrylamide (HMAM) and 2 wt% of NTC-80 (a microcrystalline cellulose) in water was prepared. The above situation, DARVAN™ (12.5 g), glycerine (8.79 g), and an aqueous solution of 2 wt % MEHQ (0.5 ml) were added to 500 g of ¾ inch diameter alumina balls 2 liter Nalgene mill jar. Fused alumina and the Al metal were added and in quantities specified below in Table 1 to the mixture in the jar to create a slurry mixture and thoroughly mixed by ball milling. The mixing time is typically at least 2 hours.

After mixing, the slurry was poured from the mill jar into another container and weighed. The slurry was then placed in a vacuum and brought to a low pressure boil to remove any entrained or trapped air (i.e. de-aired). Typical time under the vacuum is 5 minutes. While stirring the de-aired slurry, 0.01 ml of TEMED/100 G of slurry is added to the slurry. Next, while stirring, 0.2 ml of 10% solution of APS per 100 grams of mixture was then poured or injected into a die. The slurry was again de-aired for 5 minutes. The part was then placed into a 50° C. oven for ½ hour to convert the slurry into a cross linked gel. The part was removed from the die and slowly dried to prevent cracking and warping of the cast or injected part. After drying at 50° C. the part was sintered in air to 1500–1650° C. After sintering the parts had a dimensional change of less than 2% linear change in dimension from the die size and a density of 60% of theoretical. Dimensional change of less than 2% and a density between 45% and 75% were required for ceramic cores for investment casting.

The samples produced using this process would be suitable for use in an investment casting process to produce gas turbine parts. Other composition ranges specified in this patent can also be prepared using this technique. However minor modifications of the amount of liquid needed to prepare a slurry with the desired rheology that can be poured or injected would be required.

TABLE 1

| Fused Alumina | Weight |
| --- | --- |
| 120 mesh alumina | 240.00 g |
| 240 mesh alumina | 360.00 g |
| 400 mesh alumina | 240.00 g |
| 900 mesh alumina | 60.00 g |
| Aluminum metal (4 micron) | 100.00 g |

EXAMPLE 2

Example 2 used the same procedure as Example 1, with the exception that 14 micron aluminum metal was used in place of the 4 micron aluminum. After sintering the parts had a dimensional change of less than 2% linear change in dimensions from the die size and a density of 50% of theoretical. Such parts are suitable for use in an investment casting process to produce gas turbine parts.

EXAMPLE 3

Example 3 used the same procedure as Example 1, with the exception that 32 micron aluminum metal is used in place of the 4 micron aluminum. After sintering, cores of this composition were too weak to handle. These samples would not be useful for use in the investment casting process.

Although the above disclosure describes preferred embodiments of the invention, it is understood that the invention is not limited to these particular embodiments. Many variations and modifications will now occur to those skilled in the art. For complete definition of the invention, reference should be made to the appended claims.

We claim:

1. A method for fabricating a ceramic article suitable for use as a shell mold or core in the investment casting of directionally solidified eutectic and superalloy materials, comprising the steps of:
    (i) preparing a ceramic slurry of alumina, aluminum, and a solution of polymerizable binder in a liquid;
    (ii) forming the slurry into a green product of an article-shaped body; and
    (iii) heating said green product in an oxygen-containing atmosphere to form a sintered ceramic article.
2. The method for fabricating a fired ceramic article as claimed in claim 1, wherein said heating step comprises:
    (i) heating said green product in an oxygen containing atmosphere at temperatures to vaporize said liquid and to also oxidize aluminum in said green product; and
    (ii) thereafter sintering said green product at a temperature above 1000° C.
3. The method for fabricating a fired ceramic article as claimed in claim 1 wherein said heating step comprises:
    (i) heating said green product at a temperature to vaporize said liquid;
    (ii) exposing said heated green product to an oxygen-containing atmosphere; and
    (iii) thereafter sintering said green product at a temperature above approximately 1000° C.
4. The method as claimed in claim 2, wherein said polymerizable binder becomes gaseous.
5. The method as claimed in claim 4 wherein said heating step further comprises heating said green product to a temperature to gasify the polymerizable binder.

6. The method as claimed in claim 1 further comprising, after step (ii), of simultaneously exposing said green product to an oxygen-containing atmosphere and heating the green product to a temperature to permit reaction bonding of the aluminum within said green product.

7. The method as claimed in claim 3 further comprising, in step (ii) of claim 3, of simultaneously exposing said green product to an oxygen-containing atmosphere and heating the green product to a temperature to permit reaction bonding of the aluminum within said green product.

8. The method as claimed in claim 1 wherein said polymerizable binder sterically fixes said alumina.

9. The method as claimed in claim 8 wherein said polymerizable binder is an acrylamide monomer.

10. The method as claimed in claim 8 wherein said polymerizable binder is chosen from the group consisting of N-hydroxy methylacrylamide, N,N'-methylenebisacrylamide, methylenebisacrylamide, vinyl-2-pyrrolidine, and poly(ethyleneglycol) 1000 dimethacrylate.

11. The method as claimed in claim 1 wherein said green product is formed by gel casting.

12. The method as claimed in claim 1, wherein said green product is formed by extruding said ceramic slurry into a closed cavity.

13. The method as claimed in claim 1, further comprising the step of immediately prior to step (ii) of adding a gelating agent to said slurry.

14. The method as claimed in claim 13 wherein said polymerizable binder comprises N-hydroxy methylacrylamide, and said gelating agent comprises N,N,N,N'-tetramethylene diamine and ammonium persulfate.

15. The method as claimed in claim 1 wherein said solution of polymerizable binder in a liquid is an aqueous solution of N-hydroxy methyl acrylamide with the range of 1 to 20% by weight.

16. The method as claimed in claim 1 wherein said liquid is an alcohol.

17. The method as claimed in claim 1 wherein the weight ratio of alumina to aluminum within the slurry of step (ii) is within the range of 20:1 to 5:2.

18. The method as claimed in claim 1 wherein said alumina is fused alumina.

19. The method as claimed in claim 1 wherein said ceramic slurry additionally comprised yttrium and/or hafnium and/or yttrium aluminate.

20. A fired ceramic article fabricated by the method of claim 1, wherein the aluminum is reaction-bonded with the alumina.

21. A fired ceramic article fabricated by the method as claimed in claim 2.

22. A fired ceramic article fabricated by the method as claimed in claim 6.

23. A method for fabricating a green product for use as a shell mold or core in the investment casting of directionally solidified eutectic and superalloy materials, comprising:
(i) preparing a ceramic slurry of alumina, aluminum, and a solution of a polymerizable binder in a liquid;
(ii) forming the slurry into a green product of an article-shaped body; and
(iii) heating said green product in an oxygen-containing atmosphere.

24. The method for fabricating a green product as claimed in claim 23, wherein said polymerizable binder is N-hydroxymethylacrylamide.

25. The method for fabricating a green product as claimed in claim 24, further comprising the step wherein immediately prior to step (ii) of adding a gelating agent to said slurry.

26. The method for fabricating a green product as claimed in claim 25, wherein said gelating agent comprises N,N,N,N-tretramethylene diamine and ammonium persulfate.

27. The method as claimed in claim 24 wherein an inhibitor to prohibit premature cross-linking and gelation is added to the slurry in step (i).

28. The method as claimed in claim 27 wherein said inhibitor is 4-methoxyphenol.

29. The method as claimed in claim 23 wherein the weight ratio of alumina to aluminum is within the range of about 20:1 to about 5:2.

30. The method as claimed in claim 29 wherein said alumina is fused alumina.

31. The method as claimed in claim 23 wherein said polymerizable binder is an acrylamide monomer.

32. The method as claimed in claim 23 wherein said polymerizable binder is chosen from the group consisting of N-hydroxymethylacrylamide, methylacrylamide, and N,N'-methylenebisacrylamide, methylenebisacrylamide, vinyl-2-pyrrolidine, and poly(ethyleneglycol) 1000 dimethacrylate.

* * * * *

UNITED STATES PATENT AND TRADEMARK OFFICE
Certificate

Patent No. 6,152,211                                                  Patented: November 28, 2000

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: Frederic Joseph Klug, Schenectady, NY; Robert Arthur Giddings, Slingerlands, NY; Marc A. Janney, Knoxville, TN; James O. Kiggans, Jr., Oak Ridge, TN; and Terry N. Tiegs, Lenoir City, TN.

Signed and Sealed this First Day of April 2003.

TOM G. DUNN
*Supervisory Patent Examiner*
Art Unit 1725